United States Patent
Clark (10) Patent No.: US 9,723,079 B2
(45) Date of Patent: Aug. 1, 2017

(54) SYSTEM AND METHOD FOR AUTOMATIC LINK DETECTION AND LINK INITIALIZATION IN A STORAGE SYSTEM

(71) Applicant: NetApp, Inc., Sunnyvale, CA (US)

(72) Inventor: Robert Clark, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 261 days.

(21) Appl. No.: 14/341,501

(22) Filed: Jul. 25, 2014

(65) Prior Publication Data

US 2016/0028820 A1    Jan. 28, 2016

(51) Int. Cl.
| | | |
|---|---|---|
| G06F 15/16 | (2006.01) | |
| H04L 29/08 | (2006.01) | |
| G06F 3/06 | (2006.01) | |
| G02B 6/38 | (2006.01) | |
| H04L 29/06 | (2006.01) | |
| H04L 12/935 | (2013.01) | |
| H04L 29/14 | (2006.01) | |

(52) U.S. Cl.
CPC .......... *H04L 67/1097* (2013.01); *G06F 3/067* (2013.01); *H04L 67/141* (2013.01); *H04L 67/322* (2013.01); *G02B 6/3817* (2013.01); *H04L 49/3054* (2013.01); *H04L 69/24* (2013.01); *H04L 69/321* (2013.01); *H04L 69/40* (2013.01)

(58) Field of Classification Search
CPC .... G02B 6/3817; H04L 69/24; H04L 49/3054
USPC ....................................................... 709/233
See application file for complete search history.

(56) References Cited

U.S. PATENT DOCUMENTS

| | | | | |
|---|---|---|---|---|
| 6,795,450 | B1* | 9/2004 | Mills | ...................... H04L 12/12 370/419 |
| 7,817,661 | B1* | 10/2010 | Barkan | ............. H04L 12/40032 370/463 |
| 2005/0102437 | A1* | 5/2005 | Pettey | ................. G06F 13/4022 710/1 |
| 2005/0138258 | A1* | 6/2005 | Seto | ....................... G06F 13/409 710/301 |
| 2008/0183917 | A1* | 7/2008 | Cagno | ................. G06F 13/4265 710/33 |

(Continued)

*Primary Examiner* — Hieu Hoang
(74) *Attorney, Agent, or Firm* — LeClairRyan, a Professional Corporation (57) ABSTRACT

A system and method for link detection and link initialization across a range of communication media is disclosed. In an embodiment, the method includes intercepting, by a subcontroller of a first storage element, an attempt by a controller of the first storage element to establish communication with a second storage element via a first communication medium. In response to the intercepting of the attempt, a link initialization signal is provided for transmission to the second storage element via a second communication medium. The second communication medium is independent of the first communication medium. When a response is received from the second storage element indicating a successful link initialization, an indication of success is provided from the subcontroller to the controller. The indication of success corresponds to the first communication medium. In one example, the controller includes an SAS controller, and the second communication medium is an optical communication medium.

17 Claims, 6 Drawing Sheets

(56) References Cited

U.S. PATENT DOCUMENTS

| | | | | |
|---|---|---|---|---|
| 2009/0180382 A1* | 7/2009 | Klein | .................... | H04L 5/1446 |
| | | | | 370/235 |
| 2010/0296815 A1* | 11/2010 | Petty | .................. | G06F 13/4072 |
| | | | | 398/116 |
| 2011/0106997 A1* | 5/2011 | Romero | ................ | G06F 3/0607 |
| | | | | 710/300 |
| 2013/0198423 A1* | 8/2013 | Sarkar | ................... | G06F 13/385 |
| | | | | 710/74 |
| 2013/0212302 A1* | 8/2013 | Mizumura | ............ | G06F 3/0607 |
| | | | | 710/5 |
| 2014/0003283 A1* | 1/2014 | Koenen | .............. | H04L 41/0896 |
| | | | | 370/254 |
| 2014/0359177 A1* | 12/2014 | Florentino | ............ | G06F 13/387 |
| | | | | 710/104 |
| 2015/0186325 A1* | 7/2015 | Petrick | ............... | G06F 13/4027 |
| | | | | 710/313 |

\* cited by examiner

SYSTEM AND METHOD FOR AUTOMATIC LINK DETECTION AND LINK INITIALIZATION IN A STORAGE SYSTEM

TECHNICAL FIELD

The present disclosure relates generally to computing storage systems and, more particularly, to managing multiple communication links between a storage controller and a storage device and to properly initializing a link even when the communication protocol does not expressly support the communication medium.

BACKGROUND

Networks and distributed storage allow data to be shared between devices located anywhere a connection is available. Improvements in capacity and network speeds have enabled a move away from locally attached storage devices and towards centralized storage repositories such as cloud-based data storage. These storage systems may be scalable and may range from a single shared folder to a cluster of file servers attached to and controlling racks of disk arrays. These centralized offerings are delivering the promised advantages of security, worldwide accessibility, and data redundancy. To provide these services, storage systems may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Building out a storage architecture to meet these expectations enables the next generation of applications, which is expected to bring even greater demand. NetApp storage systems offer NAS and SAN capabilities and support a wide range of standards.

Despite these advances, highly-customized solutions are not always the best way to meet a customer's needs within a budget. In some applications, it is better to rely on commonly available standard-compliant hardware rather than engineer a custom solution. However, standard-compliant hardware is not without its own drawbacks and may lag behind the latest developments. For example, many communication protocols used in data storage systems such as Serial-Attached SCSI (SAS) and SATA have strict requirements governing the connections or links between devices. It would be beneficial for standard-compliant hardware to support a wider range of connection media (e.g., copper conductor, optical fiber, wireless, etc.), yet the benefit may not justify a proprietary overhaul of the standard. Instead, less radical improvements that work with standard hardware to increase the number of supported options may allow the storage system to wring more performance from the same hardware. For these reasons and others, systems and techniques that enable communication links not directly supported by a given communication standard may provide cost-effective performance enhancement.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various embodiments of the present disclosure provide a system and technique for initializing and utilizing communication links that are not explicitly supported by a given communication standard. For example, common communications standards including Serial-Attached SCSI (SAS), SATA, iSCSI, InfiniBand, PATA, USB, FireWire, and others may support only a very limited number of communication media (e.g., copper conductor, optical fiber, wireless, etc.). To overcome these limitations, a physical-layer subcontroller that supports additional communication media may be added in communication with a standard controller. The physical-layer subcontroller handles the transport of data (including session setup and teardown) across a wide array of communication media while emulating a known and supported communication medium when communicating with the standard controller. In some examples, this allows legacy hardware to be used with newer and otherwise unsupported communication links. Particularly when the newer communication links offer improved bandwidth, throughput, latency, or other performance benefits, this technique offers an affordable method of improving system performance without significantly increasing system cost or complexity. It is understood that these advantages are merely exemplary, and no particular advantage or benefit is necessary or required for any particular embodiment.

Figure 1:
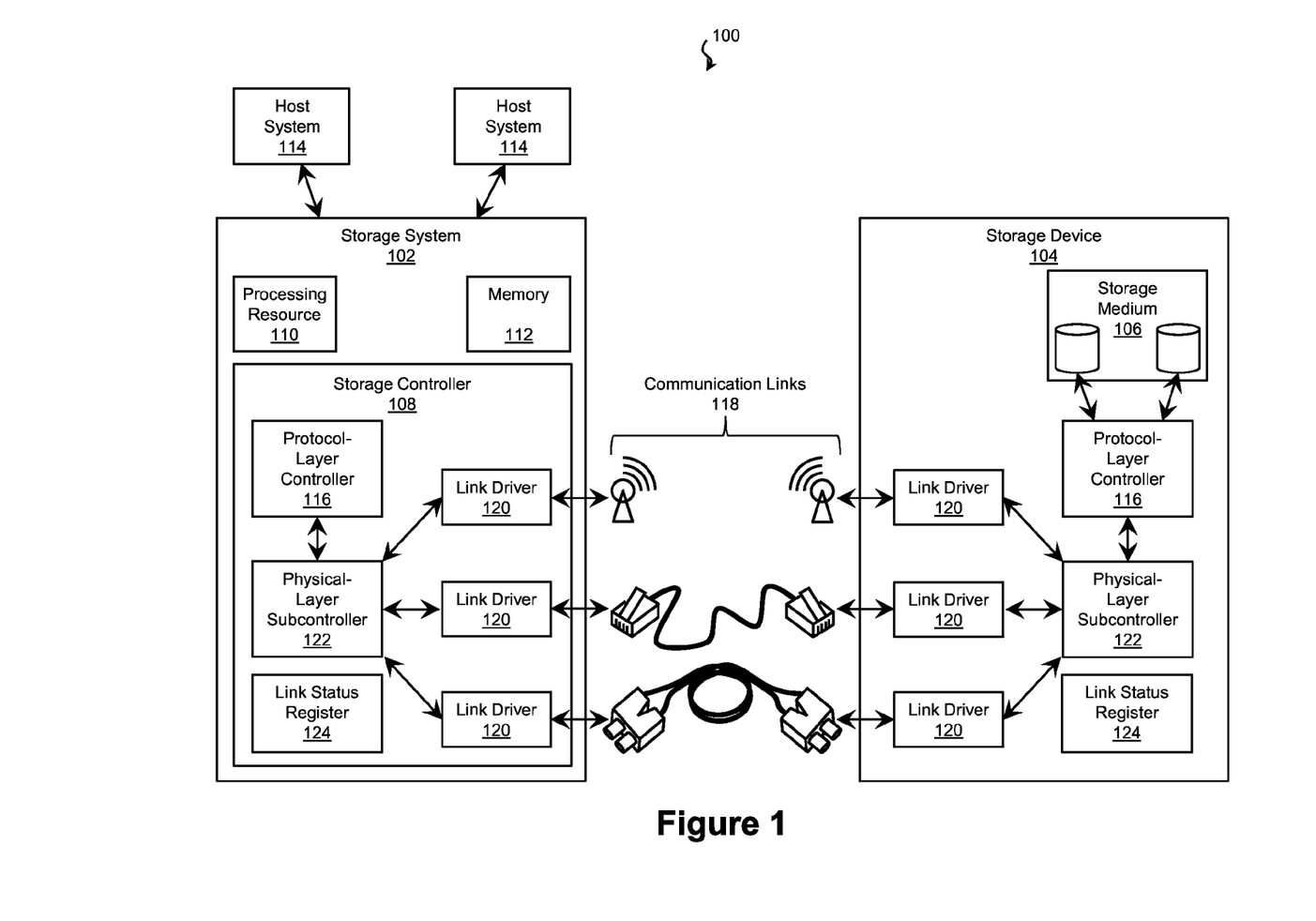
FIG. 1 is a schematic diagram of a storage environment according to some embodiments of the present disclosure.

Referring first to FIG. 1, illustrated is a schematic diagram of a storage environment 100 according to some embodiments of the present disclosure. FIG. 1 represents a relatively simple application in which the storage environment 100 includes a storage system 102 in communication with a storage device 104. The storage system 102 is operable to access (e.g., read, write, etc.) data stored by and on the storage device 104. In various examples, the storage device 104 includes storage media 106 such as a hard disk drive (HDD), a solid-state drive (SSD), an optical drive, and/or any other suitable volatile or non-volatile data storage medium. It is understood that for clarity and ease of explanation, only a limited number of storage systems 102 and storage devices 104 are illustrated, although the storage environment 100 may include any number of storage devices 104 coupled to any number of storage controllers 108, some examples of which described later in the context of FIG. 5.

Furthermore, while the storage system 102 is referred to as a singular entity, it may include any number of computing devices and may range from a single computing system to a system cluster of any size. Accordingly, in the illustrated embodiment, the storage system 102 includes at least one computing system, which in turn includes one or more processing resources 110 such as a microcontroller or a central processing unit (CPU) operable to perform various computing instructions. The computing system may also include any combination of memory devices 112 such as random access memory (RAM); static RAM (SRAM) or Flash memory; a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

To interact with the storage device 104, the storage system 102 includes a storage controller 108. The storage controller 108 exercises low-level control over the storage device 104 in order to execute (perform) data transactions on behalf of the storage system 102. The storage controller 108 may also perform data transactions on behalf of other computing systems such as network-attached host systems 114. In some examples, the storage controller 108 handles overhead processing (e.g., address translation) to provide virtual drives within the storage device 104. In this way, the storage controller 108 provides an interface for communicating with the storage devices 104 of the storage environment 100. The transactions exchanged between the storage controller 108 and the storage device 104 may conform to any suitable communication protocol. The protocol of the storage controller 108 and the storage device 104 governs the format of the data transactions exchanged between the devices. In various embodiments, the storage controller 108 communicates with the storage device according to Serial-Attached SCSI (SAS), SATA, iSCSI, InfiniBand, Fibre Channel, and/or Fibre Channel over Ethernet (FCoE) protocols. Other suitable protocols include eSATA, PATA, USB, FireWire, etc.

Accordingly, storage controller 108 and the storage device 104 each include a protocol controller 116 operable to exchange data transactions according to a communication protocol supported by both devices. The protocol controller 116 may include any combination of hardware, software, and/or firmware, and in an exemplary embodiment, includes an Application-Specific Integrated Circuit (ASIC) programmed to perform the ascribed functions. In some embodiments, the protocol controllers 116 of the storage controller 108 and the storage device 104 support multiple protocols. In such embodiments, the protocol controllers 116 agree upon a suitable protocol supported by both devices during a handshaking or initialization process.

In order to communicate, the storage controller 108 and the storage system 102 exchange data transactions over one or more physical communication links 118. These communication links 118 may use any suitable communication medium, and in the illustrated embodiments, include conductive communication links, optical communication links, and/or wireless communication links. Suitable conductive communication links 118 include twisted pair connections (e.g., Level 1 UTP, Category 5, Category 5e, Category 6, etc.), coaxial connections, and/or other conductor arrangements. Optical communication links 118 include infrared and/or visible optical communication over one or more fiber optic cables. Wireless communication links 118 include any suitable point-to-point or networked wireless communication using any suitable frequency. Each communication link 118 may include one or more associated link drivers 120 that generate and drive the associated voltage, light, wireless frequency, and/or other characteristic signals over the link 118. The link drivers 120 also receive such signals via the link 118. In a hierarchical communication model, these interactions over the communication links 118 are said to occur at the "physical level" or "physical layer".

Many communication protocols, including many of the aforementioned protocols, also specify some or all behavior of the communication links 118 at the physical layer (e.g., voltage range, number of conductors, frequency, timing, session setup and teardown, etc.). Thus, in some embodiments, the protocol controller 116 interacts directly with the link drivers 120 to send and receive data over the communication links 118 in a manner consistent with the protocol. However, it has been determined that there are advantages to creating a level of abstraction allowing the physical level to operate independent of the protocol level for at least some aspects of transmission, even if the protocol specifies physical level behavior. For example, this may allow the use of a communication medium that is not supported by a particular protocol. In one embodiment, the protocol controller 116 is an SAS-compliant controller that does not support optical communication links 118. Some SAS versions rely on Out-of-Band (OOB) communications to initialize a link 118 and to manage storage devices 104. During link initialization, OOB signals are used to define various requirements for DC level communication and sensing. However, these same SAS versions may lack analogous techniques for initializing an optical communication link. Because an optical link 118 cannot be properly initialized, left unchecked, the receiver may drift into an operation region where the output is merely a reflection of noise on the input.

For this reason and others, the storage controller 108 and/or the storage device 104 may each include a physical-layer subcontroller 122 in communication with the protocol controller 116 and the communication link driver(s) 120. The physical-layer subcontroller 122 may include any combination of hardware, software, and/or firmware, and in an exemplary embodiment, includes an ASIC programmed to perform the ascribed functions. At a high level, the physical-layer subcontroller 122 establishes communication across a communication link 118 and handles the flow of data transactions across the communication link 118. This may include formatting protocol-compliant data transactions received from the protocol controller 116 for communication over the communication link 118 and translating data transactions received via the communication link 118 into a format suitable for providing to the protocol controller 116. In this way, the physical-layer subcontroller 122 provides a level of abstraction that hides some or all of the specifics of the physical communication link 118 from the protocol controller 116. Thus, the communication links 118 used by the physical-layer subcontroller 122 may use any suitable communication medium or media independent of the physical medium supported by the protocol controller 116.

In examples where the physical-layer subcontroller 122 may be coupled to a number of different communication links 118 over a number of different media, the physical-layer subcontroller 122 may also determine which of the possible communication links 118 are actually connected or otherwise available for use in communicating between the devices. Accordingly, in some embodiments, the physical-layer subcontroller 122 attempts to initialize communication over each of the links 118 until communication is established between the storage system 102 and the storage device 104. This allows the physical-layer subcontroller 122 to adapt and respond to the particular configuration of the storage environment 100.

To prevent attempts to initialize a link 118 that is clearly non-functional, the physical-layer subcontroller 122 may detect whether the associated hardware (e.g., controller, cable, driver, etc.) is installed and active. For example, in some embodiments, the physical-layer subcontroller 122 detects a property indicating a cable has been properly coupled to the link driver 120 and/or indicating that the cable has been properly coupled to the other storage element. In some embodiments, the physical-layer subcontroller 122 detects a property of a modular link driver 120 indicating whether the link driver 120 has been installed and if so, what communication media the link driver 120 corresponds to. For example, QSFP (Quad-channel Small Form-factor Pluggable) modules contain a link driver 120 (typically an optical transceiver) that can be plugged in to an element of a storage environment in order to support a communication link 118. In one such embodiment, the physical-layer subcontroller 122 detects the presence and type of a QSFP module using the QSFP interface. The physical-layer subcontroller 122 may store information on hardware presence, link availability, and/or other link status parameters in a register 124 for use in communication over the link 118. This may streamline the link initialization process.

On the other side of the communication link 118, the storage device 104 may include a protocol controller 116 and a physical-layer subcontroller 122 substantially similar to those of the storage controller 108. The physical-layer subcontroller 122 interacts with the link drivers 120 of the storage device 104 to provide a level of abstraction for the protocol controller 116. For example, data transactions received by the physical-layer subcontroller 122 via the link drivers 120 may be reformatted or re-packetized according to a protocol supported by the protocol controller 116. The protocol-layer controller may then service the requests using the associated storage medium 106. Data transmission from the storage device 104 to the storage system 102 may proceed substantially similar to data transmission from the storage system 102 to the storage device 104 described above.

Figure 2A:
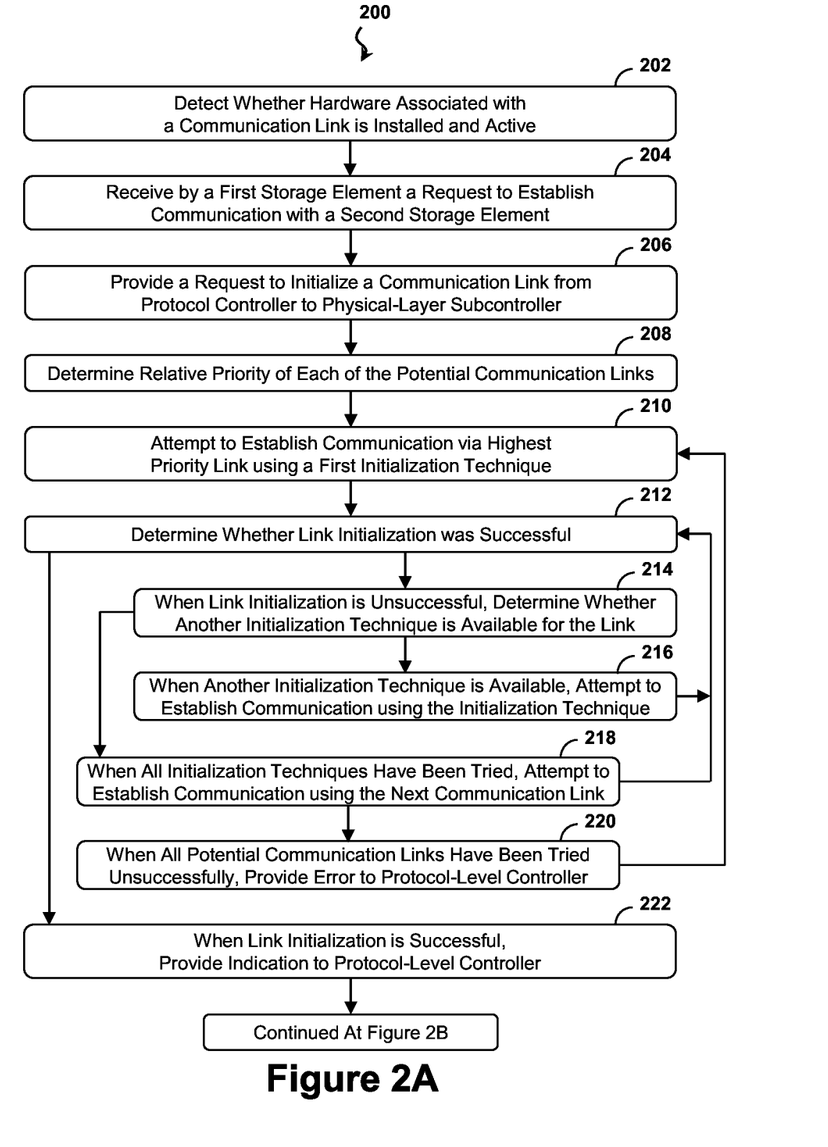
FIGS. 2A and 2B are flow diagrams of a method of exchanging data transactions between two storage elements according to some embodiments of the present disclosure.
Figure 2B:
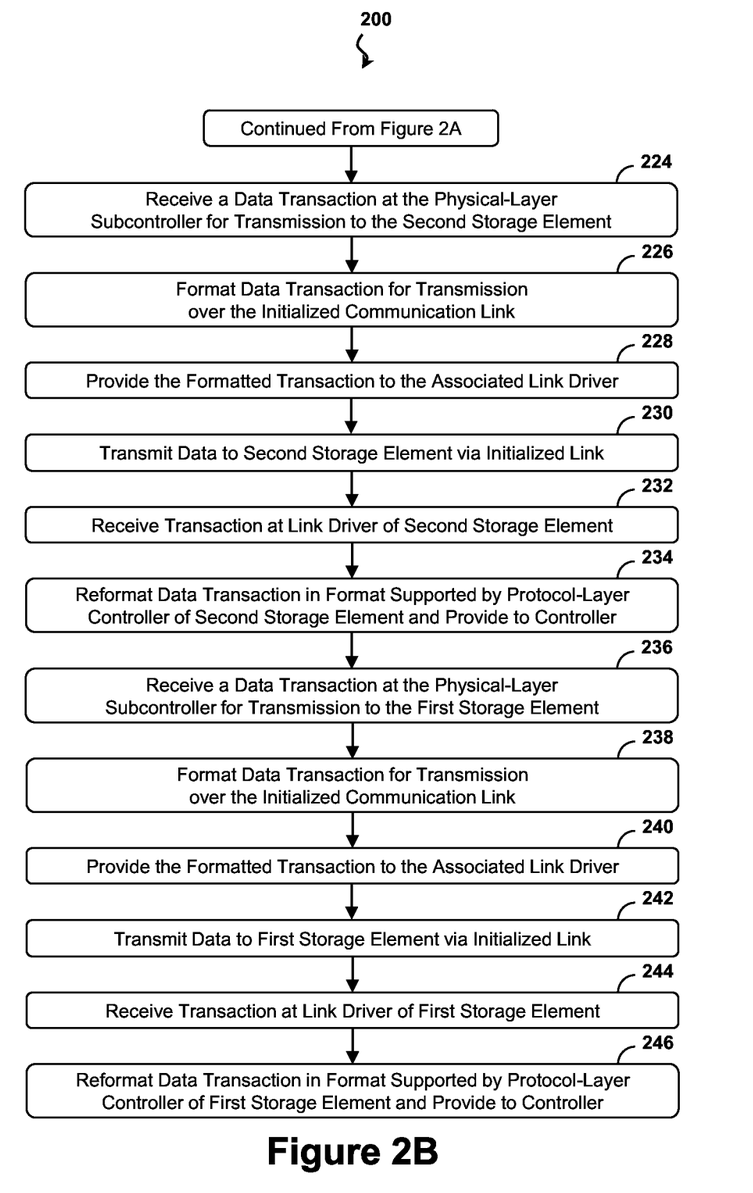
Figure 3:
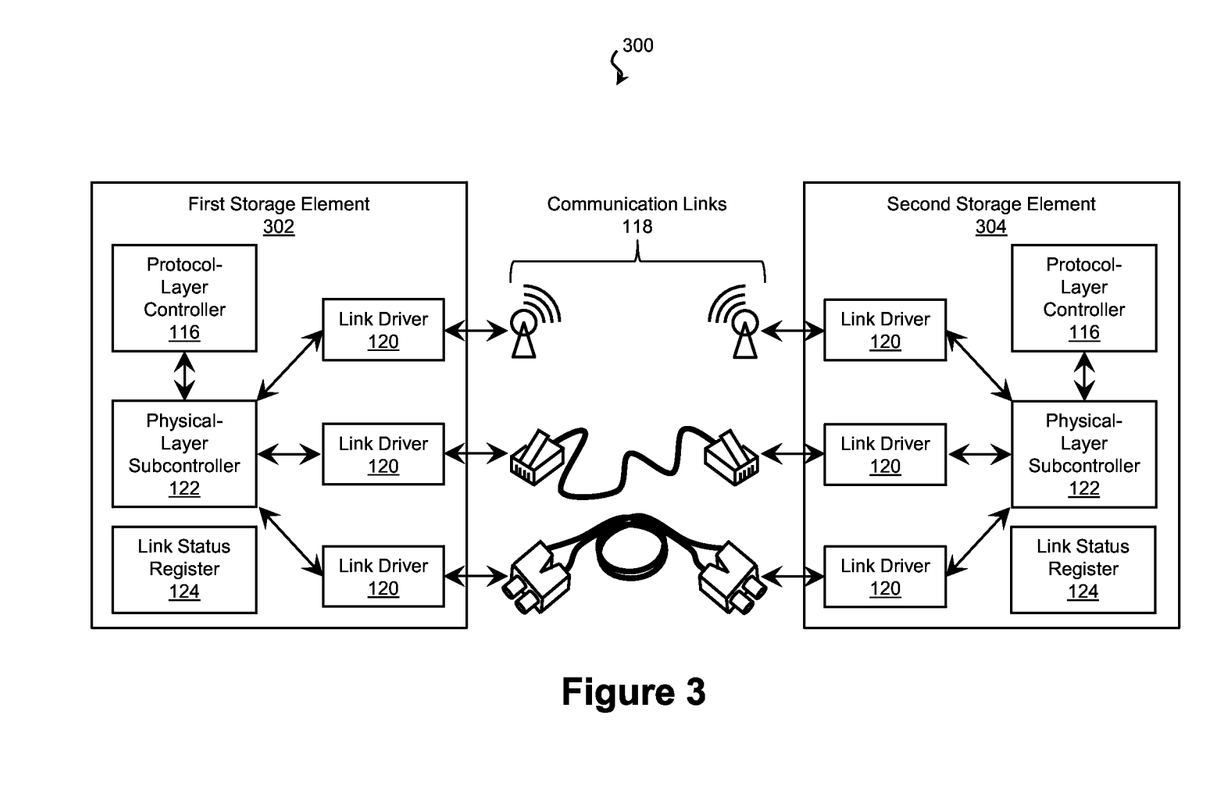
FIG. 3 is a schematic diagram of a storage environment undergoing the method of exchanging data transactions according to some embodiments of the present disclosure.

The operation of the storage environment 100 will now be described in more detail with reference to FIGS. 2A, 2B, and 3. FIGS. 2A and 2B are flow diagrams of a method 200 of exchanging data transactions between two storage elements such as a storage system 102 and a storage device 104. It is understood that additional steps can be provided before, during, and after the steps of method 200, and that some of the steps described can be replaced or eliminated for other embodiments of the method 200. FIG. 3 is a schematic diagram of a storage environment 300 undergoing the method of exchanging data transactions according to some embodiments of the present disclosure. In many respects, the storage environment 300 is substantially similar to the storage environment 100 of FIG. 1.

Referring to FIG. 3, during the method 200, a first storage element 302 (e.g., the storage system 102 of FIG. 1) attempts to establish communication with a second storage element 304 (e.g., the storage device 104 of FIG. 1) over one or more communication links 118. In order to expedite this process, at any time before, during, or after establishing communication, the physical-layer subcontroller 122 of the first storage element 302 may detect whether hardware associated with a communication link 118 is installed and active as described in block 202 of FIG. 2A. For example, in some embodiments, the physical-layer subcontroller 122 detects a property indicating a cable has been properly coupled to the link driver 120 of the first storage element 302 and/or indicating that the cable has been properly coupled to the second storage element 304. In some embodiments, the physical-layer subcontroller 122 detects a property of a modular link driver 120 indicating whether the link driver 120 has been installed and if so, what communication media the link driver 120 corresponds to. The physical-layer subcontroller 122 may store information on hardware presence, link availability, and/or other link parameters in a register 124 for later reference.

Referring to block 204 of FIG. 2A, a component of the first storage element 302 receives a request to establish communication between the first storage element 302 and the second storage element 304. For example, this may occur when a storage element is started or restarted, when a storage device 104 is added to the storage environment 300, or when the configuration of the storage system 102 changes and renders a previous link 118 invalid. In some embodiments, a component of the storage system 102 detects a change to the storage system 102 and generates the request. In some embodiments, a user provides an administrative command to the storage system 102 requesting that communication be established. The request to establish communication may take any suitable form and may depend on the communication protocol used by the storage elements. The request is provided to the protocol controller 116 of the first storage element 302.

Referring to block 206, the protocol controller 116 of the first storage element 302 provides a request to the associated physical-layer subcontroller 122 to initialize a link 118 between the first storage element 302 and the second storage element 304. In some embodiments, the protocol controller 116 is aware of the physical-layer subcontroller 122 and the request to initialize the link may be trivial in format and in its transmission. However, as discussed above, a discrete physical-layer subcontroller 122 may be used even when the protocol already specifies physical layer behavior. For example, in some embodiments, a physical-layer subcontroller 122 is used with a legacy protocol controller 116 that supports some but not all of the available communication links 118. In one such embodiment, the protocol controller 116 is an older SAS (e.g., SAS 2.0 or older) controller that does not support optical communication links 118. In these embodiments, the physical-layer subcontroller 122 may emulate a first type of communication link supported by the protocol while actually transmitting data via a different type of communication link 118. In such examples, the physical-layer subcontroller 122 may intercept an attempt by the physical-layer subcontroller 122 to instruct a link driver 120 to initialize a link 118 between the first storage element 302 and the second storage element 304. The intercepted attempt serves as the request of block 206.

Referring to block 208, the physical-layer subcontroller 122 of the first storage element 302 determines a relative priority for each potential communication link 118 between the first storage element 302 and the second storage element 304. The priority of a link 118 relates to the order in which it is used in an attempt to establish communication between the first storage element 302 and the second. In that regard, each communication link 118 may have a priority assigned to it based on latency, bandwidth, throughput, reliability, convenience, likelihood of being used, and/or any other suitable metric. The physical-layer subcontroller 122 may also deprioritize or remove from consideration those communication links 118 for which associated hardware is not installed or available. To do so, in an embodiment, the physical-layer subcontroller 122 queries a register 124 to determine status of the various communication links 118.

Referring to block 210, the physical-layer subcontroller 122 of the first storage element 302 attempts to establish communication via the highest priority communication link 118 using a first link initialization technique. The link initialization technique (i.e., link initialization protocol) may specify a set of handshaking signals exchanged between two devices (e.g., the first storage element 302 and the second storage element 304) in order to agree upon various data transmission aspects, such as what transmission protocol to use, data rates, packet structures, and other communications parameters. The handshaking signals may also be used to measure communication aspects such as clock skew, voltage levels, and/or transceiver power levels. The exact sequence of signals exchanged and their significance may depend on the particular link initialization technique.

As discussed above, the physical-layer subcontroller 122 allows the use of link behavior (including a link initialization technique) that differs from that specified by the protocol of the protocol controller 116. In one example, the first storage element 302 and the second storage element 304 both include SAS protocol controllers 116 that only provide for conductive communication link initialization. Accordingly, in the example, the physical-layer subcontroller 122 intercepts an attempt by the protocol controller 116 to initialize a conductive communication link 118 in block 206. In response, the physical-layer subcontroller 122 attempts to initialize the highest priority communication link 118 in block 210 regardless of whether the link 118 is a conductive communication link 118. In so doing, the physical-layer subcontroller 122 increases the number of supported link media without changing the hardware and/or software of the protocol controller 116.

Referring to block 212, the physical-layer subcontroller 122 of the first storage element 302 determines whether the link initialization was successful. To do so, the physical-layer subcontroller 122 may monitor the communication link 118 for a response from the second storage element 304 in accordance with the link initialization technique. If the link initialization is unsuccessful, in block 214, the physical-layer subcontroller 122 determines whether another link initialization technique is available for the current link 118. For example, the physical-layer subcontroller 122 may support one or more standard-compliant and one or more proprietary link initialization techniques for a single communication link 118. If another link initialization technique is available, in block 216, the physical-layer subcontroller 122 of the first storage element 302 attempts to establish communication with the second storage element 304 using this link initialization technique and the selected communication link 118. If all available link initialization techniques have been attempted, in block 218, the physical-layer subcontroller 122 of the first storage element 302 attempts to initialize the communication link 118 having the next highest priority. Referring to block 220, if the available communication links 118 and initialization techniques have been exhausted without success, the physical-layer subcontroller 122 returns an error to the protocol controller 116 and may restart the sequence with the first link and the first link initialization technique.

At any time, if the link initialization is successful, in block 222, the physical-layer subcontroller 122 of the first storage element 302 returns an indication of success to the respective protocol controller 116. In some embodiments, such as those where the protocol controller 116 is aware of the physical-layer subcontroller 122, the indication of success may be trivial in format and in its transmission. In contrast, in further embodiments, the physical-layer subcontroller 122 emulates a communication medium supported by the protocol controller 116. In such embodiments, the indication of success provided by the physical-layer subcontroller 122 may simulate a response to the intercepted link initialization technique attempted by the protocol controller 116. In this way, the physical-layer subcontroller 122 simulates a response of the second storage element 304 had it been contacted by the protocol controller 116 of the first storage element 302 directly. In the previous example in which the physical-layer subcontroller 122 is an SAS-type controller that only supports conductive communication links 118, the physical-layer subcontroller 122 responds with signals that simulate the second storage element 304 being coupled via a conductive communication link 118. The physical-layer subcontroller 122 does so regardless of whether the actual communication link 118 to the second storage element 304 is conductive-type.

Once the link has been initialized, the first and second storage elements exchange data transactions over the initialized communication link 118 at will. Blocks 224-234 describe the flow of data transactions from the first storage element 302 to the second storage element 304, while blocks 236-246 describe the flow of transactions from the second storage element 304 to the first storage element 302. Referring first to block 224, the physical-layer subcontroller 122 of the first storage element 302 receives a data transaction to be transmitted to the second storage element 304. The data transaction may be received from the protocol controller 116 or any other component of the first storage element 302. If the data is not in a format suitable for transmission over the initialized communication link 118, the physical-layer subcontroller 122 may packetize or otherwise format the data transaction for transmission as described in block 226. Referring to block 228, the physical-layer subcontroller 122 then provides the formatted data transaction to the link driver 120 associated with the initialized communication link 118. The link driver 120 transmits the transaction to the second storage element 304 via the initialized communication link 118 in block 230. Referring to block 232, the transaction is received by a link driver 120 of the second storage element that is associated with the initialized communication link 118. The link driver 120 forwards the data transaction to the physical-layer subcontroller 122.

Similar to the physical-layer subcontroller 122 of the first storage element 302, the physical-layer subcontroller of the second storage element 304 may simulate a supported communication medium when interacting with the local protocol controller 116 while actually communicating with the first storage element 302 using a different communication medium. Accordingly, if the received data is not in a format supported by the protocol controller 116 of the second storage element, the physical-layer subcontroller 122 may re-packetize or otherwise reformat the data before providing it to the protocol controller 116 as described in block 234.

In many embodiments, responses from the second storage element 304 to the first storage element 302 proceed in a symmetrical manner. Accordingly, referring to block 236, the physical-layer subcontroller 122 of the second storage element 304 receives a data transaction to be transmitted to the first storage element 302. The data transaction may be received from the protocol controller 116 or any other component of the second storage element 304. If the transaction is not in a format suitable for transmission over the initialized communication link 118, the physical-layer subcontroller 122 may packetize or otherwise format the transaction for transmission as described in block 238. The physical-layer subcontroller 122 then provides the data transaction to the link driver 120 associated with the initialized communication link 118 in block 240. The link driver 120 transmits the transaction to the first storage element 302 via the initialized communication link 118 in block 242. Referring to block 244, the data transaction is received by a link driver 120 of the first storage element that is associated with the initialized communication link 118. The link driver 120 forwards the data transaction to the physical-layer subcontroller 122. If the received data transaction is not in a format supported by the protocol controller 116 of the first storage element, the physical-layer subcontroller 122 may re-packetize or otherwise reformat the data transaction before providing it to the protocol controller 116 as described in block 246. Data exchanges across the communication link 118 as described in blocks 224-234 and 236-246 continue until all outstanding data transactions have been exchanged.

Figure 4:
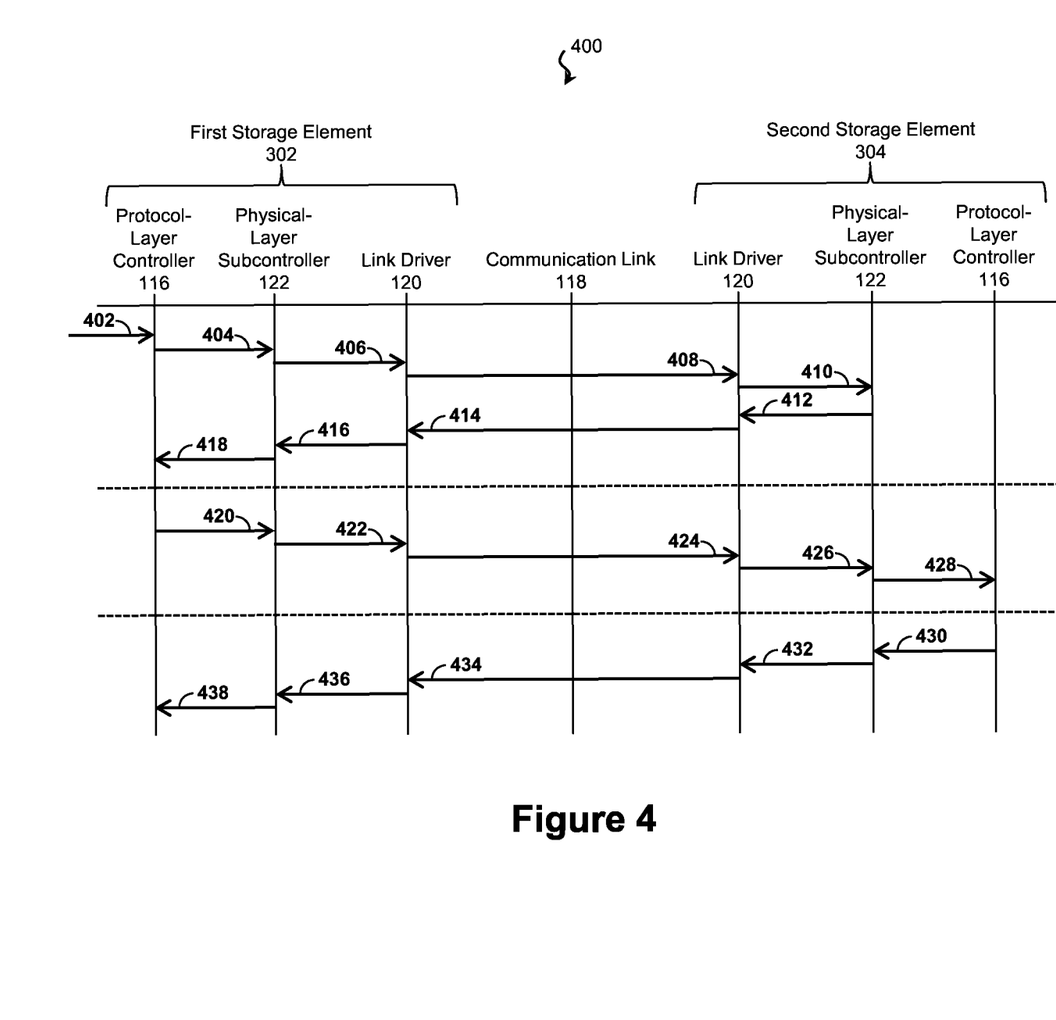
FIG. 4 is a timing diagram illustrating an exemplary sequence for performing the method of exchanging data transactions between two storage elements according to some embodiments of the present disclosure.

The sequence of method 200 will now be described in more detail with reference to FIG. 4. FIG. 4 is a timing diagram illustrating an exemplary sequence 400 for performing the method 200 of exchanging data transactions between two storage elements according to some embodiments of the present disclosure.

Arrow 402 represents the first storage element 302 receiving the request to establish communication between the first storage element 302 and the second storage element 304 as described in block 204. In the illustrated embodiment, the request is received by the protocol controller 116 of the first storage element 302. Arrow 404 represents the protocol controller 116 of the first storage element 302 providing a request to establish a link to the associated physical-layer subcontroller 122 as described in block 206. Arrows 406-416 represent the physical-layer subcontroller 122 successfully attempting to initialize a communication link 118 as described in blocks 210-220. Arrow 406 represents the physical-layer subcontroller 122 providing a set of initialization signals to a link driver 120 for transmission over the selected communication link 118. Arrow 408 represents the link driver 120 of the first storage element 302 providing the initialization signals to the link driver 120 of the second storage element 304 via the communication link 118. Arrow 410 represents the link driver 120 providing the received initialization signals to the physical-layer subcontroller 122 of the second storage element 304. Arrow 412 represents the physical-layer subcontroller 122 providing an initialization response to the link driver 120 for transmission to the first storage element 302 via the communication link. The response may be prepared with or without assistance from the protocol controller 116 of the second storage element 304. Arrow 414 represents the link driver 120 of the second storage element 304 providing the initialization response to the first storage element 302 via the communication link 118 and arrow 416 represents the receiving link driver 120 providing the initialization response to the physical-layer subcontroller 122.

In the illustrated example, the physical-layer subcontroller 122 recognizes the received response as a successful initialization of the communication link 118 and provides an indication of success to the respective protocol controller 116 as shown by arrow 418 and described in block 222.

Once the link has been initialized, the first and second storage elements exchange data transactions over the initialized communication link 118 at will. Arrows 420-428 show the flow of data transactions from the first storage element 302 to the second storage element 304, while arrows 430-438 show the flow of transactions from the second storage element 304 to the first storage element 302.

Arrow 420 represents the physical-layer subcontroller 122 of the first storage element 302 receiving a data transaction to be transmitted to the second storage element 304 as described in block 224. In the illustrated embodiment, the data transaction is provided by the protocol controller 116. Arrow 422 represents the physical-layer subcontroller 122 providing the data transaction to the link driver 120 associated with the initialized communication link 118 as described in block 228. Arrow 424 represents the link driver 120 of the first storage element 302 transmitting the transaction to the second storage element 304 via the initialized communication link 118. Arrow 426 represents the link driver 120 of the second storage element 304 receiving the transmitted transaction and providing it to the physical-layer subcontroller 122. Arrow 428 represents the link driver 120 providing the received data transaction to the protocol controller 116.

Analogously, arrows 430-438 show transmission of data in the opposite direction. Arrow 430 represents the physical-layer subcontroller 122 of the second storage element 304 receiving a data transaction to be transmitted to the first storage element 302 as described in block 236. In the illustrated embodiment, the data transaction is provided by the protocol controller 116. Arrow 432 represents the physical-layer subcontroller 122 providing the data transaction to the link driver 120 associated with the initialized communication link 118 as described in block 240. Arrow 434 represents the link driver 120 of the second storage element 304 transmitting the transaction to the first storage element 302 via the initialized communication link 118. Arrow 436 represents the link driver 120 of the first storage element 302 receiving the transmitted transaction and providing it to the physical-layer subcontroller 122. Arrow 438 represents the link driver 120 providing the received data transaction to the protocol controller 116.

Figure 5:
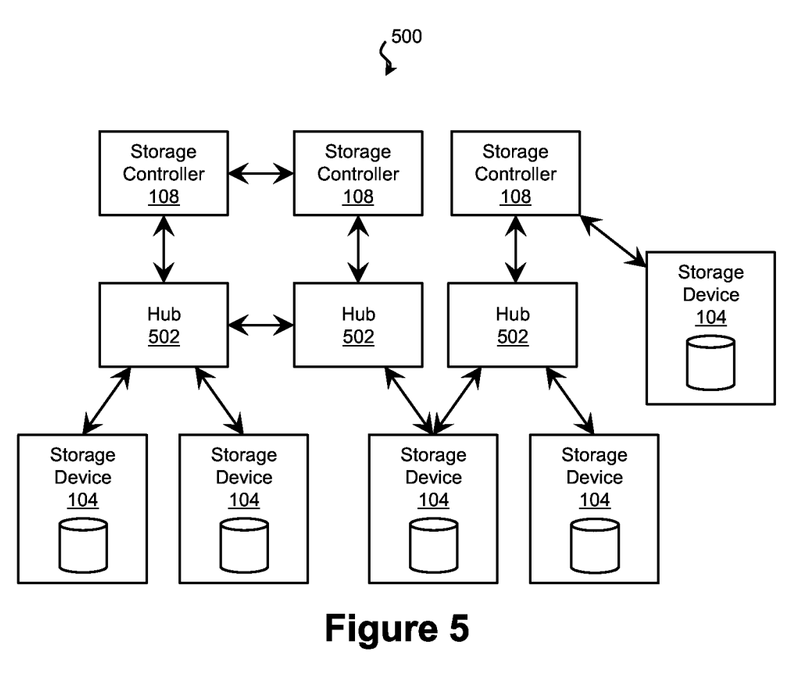
FIG. 5 is a schematic diagram of a storage environment according to some embodiments of the present disclosure.

As discussed above, any storage element of a storage environment may serve as the first storage element 302 (i.e., the initiating storage element) and any storage element may serve as the second storage element 304 (i.e., the target storage element). In comparison to FIG. 1, FIG. 5 illustrates a more complicated storage environment 500 with a wider array of suitable storage elements. In that regard, FIG. 5 is a schematic diagram of a storage environment 500 according to some embodiments of the present disclosure. In many aspects, the storage environment 500 is substantially similar to the storage environment 100 of FIG. 1.

Storage environment 500 includes a plurality of storage controllers 108, each of which may be substantially similar to the storage controller 108 of FIG. 1, and a plurality of storage devices 104, each of which may be substantially similar to the storage device 104 of FIG. 1. The storage controllers 108 may be directly connected to the storage devices 104 and may also be connected to storage devices 104 through one or more hubs 502. A hub 502 may include any device that communicatively couples other storage elements. For example, in an SAS storage environment 500, hubs 502 include SAS expanders. In an FCoE storage environment 500, hubs 502 include routers, switches, and/or other Ethernet hubs. The hubs 502 may be communicatively coupled to storage controllers 108 and storage devices 104 as well to as other hubs 502. In the above examples, any of the storage elements (e.g., storage controllers 108, storage devices 104, and/or hubs 502) may serve as either the first storage element 302 or the second storage element 304 in any combination.

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors 110 of the storage system 102 execute code to implement the actions described above.

Accordingly, a system and method for managing one or more communication links and for managing the links independent of a particular higher-level protocol is provided. In some exemplary embodiments, the method includes intercepting, by a subcontroller of a first storage element, an attempt by a controller of the first storage element to establish communication with a second storage element via a first communication medium. In response to the intercepting of the attempt, a link initialization signal is provided for transmission to the second storage element via a second communication medium. The second communication medium is independent of the first communication medium. When a response is received from the second storage element indicating a successful link initialization, an indication of success is provided from the subcontroller to the controller. The indication of success corresponds to the first communication medium. In some such embodiments, the controller includes a Serial-Attached SCSI (SAS) controller, and the second communication medium is an optical communication medium. In some such embodiments, the method further includes, in an attempt to initialize a communication link, transmitting the first link initialization signal from the first storage element to the second storage element via the communication link; and when it is determined that the attempt to initialize the communication link was unsuccessful, transmitting a second link initialization signal corresponding to a second link initialization protocol via the communication link.

In further exemplary embodiments, the communication method includes receiving, at a component of a first storage element, a request to establish communication between the first storage element and a second storage element and determining whether hardware associated with a first communication link is present. The first communication link utilizes a first communication medium. In response to determining that the hardware is present and in response to the request, a first initialization signal is transmitted from the first storage element to the second storage element over the first communication link. In response to determining that communication was not successfully established over the first communication link, a second initialization signal is transmitted from the first storage element to the second storage element over a second communication link utilizing a second communication medium. In some such embodiments, the first communication medium is an optical communication medium, and the received request is a Serial-Attached SCSI (SAS) request to establish communication using a medium other than an optical communication medium. In some such embodiments, the determining of whether the hardware is present includes determining whether a Quad-channel Small Form-factor Pluggable (QSFP) link driver is present.

In further exemplary embodiments, an apparatus is provided that includes a non-transitory, tangible computer readable storage medium storing a computer program. The computer program has instructions that, when executed by a computer processor, carry out: receiving a request to establish communication between the first storage element and a second storage element and determining that hardware associated with a first communication link is present, where the first communication link utilizes a first communication medium. The computer program has further instructions that carry out: in response to determining that the hardware is present and in response to the request, transmitting a first initialization signal from the first storage element to the second storage element over the first communication link; and, in response to determining that communication was not successfully established over the first communication link, transmitting a second initialization signal from the first storage element to the second storage element over a second communication link utilizing a second communication medium. In some such embodiments, the instructions that carry out determining whether the hardware is present include further instructions that carry out determining whether a Quad-channel Small Form-factor Pluggable (QSFP) link driver is present. In some such embodiments, the instructions that carry out determining whether the hardware is present include instructions that carry out determining whether a cable has been connected to at least one of the first storage element or the second storage element In yet further exemplary embodiments, the storage controller includes a Serial-Attached SCSI (SAS) controller, a subcontroller, and a plurality of link drivers operable to transmit a signal to another storage element. The subcontroller is operable to: intercept an attempt by the SAS controller to initialize communication with the other storage element via a first communication medium; and based on the intercepted attempt, provide a signal to a driver of the plurality of link drivers for initializing a communication link between the storage controller and the other storage element, wherein the communication link utilizes a second communication medium independent of the first communication medium. In some such embodiments, the second communication medium is an optical communication medium.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
    intercepting, by a subcontroller of a computing device, an attempt by a controller of the computing device to establish communication with a storage element via a first communication medium;
    in response to the intercepting of the attempt, providing a first available link initialization signal that corresponds to a first link initialization protocol for transmission to the storage element via a second communication medium, wherein the second communication medium is independent of the first communication medium;
    in response to determining that the attempt to initialize a communication link was unsuccessful, transmitting a second available link initialization signal corresponding to a second link initialization protocol via the second communication medium;
    receiving a response from the storage element indicating a successful link initialization; and
    providing an indication of success from the subcontroller to the controller, wherein the indication of success corresponds to the first communication medium.

2. The method of claim 1, wherein the controller includes a Serial-Attached SCSI (SAS) controller, and wherein the second communication medium is an optical communication medium.

3. The method of claim 2, wherein the storage element includes a storage system having a storage controller that includes the controller and the subcontroller.

4. The method of claim 1, further comprising:
    in response to determining that the attempt to initialize the communication link was unsuccessful, transmitting another link initialization signal from the computing device to the storage element via a third communication medium.

5. The method of claim 1 further comprising:
    determining that hardware associated with a communication link is present; and
    thereafter providing the link initialization signal from the computing device to the storage element via the communication link based on determining that the hardware associated with the communication link is present.

6. The method of claim 5, wherein the determining when the hardware is present includes detecting the presence of a Quad-channel Small Form-factor Pluggable (QSFP) module using a QSFP interface.

7. The method of claim 1 further comprising:
    receiving data for transmission to the storage element at the subcontroller, wherein the received data is formatted for the first communication medium;
    reformatting the data for transmission via the second communication medium; and
    providing the reformatted data for transmission to the storage element via the second communication medium.

8. The method of claim 7, wherein the data is a first set of data, the method further comprising:
    receiving a second set of data from the storage element at the subcontroller, wherein the received second set of data is formatted for the second communication medium;
    reformatting the second set of data according to the first communication medium; and
    providing the reformatted second set of data from the subcontroller to the controller.

9. A method comprising:
    receiving, by a subcontroller of a computing device, a request to establish communication with a storage element;
    determining that hardware associated with a first communication link is present, wherein the first communication link utilizes a first communication medium;
    in response to determining that the hardware is present and in response to the request, transmitting a first initialization signal to the storage element over the first communication link;
    in response to determining that communication was not successfully established over the first communication link with the first initialization signal, transmitting at least one other initialization signal to the storage element over the first communication link; and
    in response to determining that the attempt to initialize the communication over the first communication link with the at least one other initialization signal was unsuccessful, transmitting a first available link initialization signal corresponding to a second link initialization protocol via a second communication link that is independent of the first communication link.

10. The method of claim 9, wherein the first communication medium is an optical communication medium, and wherein the received request is a Serial-Attached SCSI (SAS) request to establish communication using a medium other than an optical communication medium.

11. The method of claim 9, wherein the determining when the hardware is present includes determining whether a Quad-channel Small Form-factor Pluggable (QSFP) link driver is present.

12. The method of claim 9, wherein the determining when the hardware is present includes determining whether a cable has been connected.

13. A computing device comprising:
    a memory containing a machine readable medium comprising machine executable code having stored thereon instructions for performing a method of communicating between storage elements of a storage system;
    a processor coupled to the memory, the processor configured to execute the machine executable code to the processor to:
        intercept an attempt by a controller to initialize communication with a storage element via a first communication medium;
        based on the intercepted attempt, provide a signal to a driver of a plurality of link drivers for initializing a first communication link between the controller the storage element, wherein the first communication link utilizes a second communication medium independent of the first communication medium;
        detect that the first communication link was not successfully initialized; and
        in response to detecting that the first communication link was not successfully initialized, provide a signal to another driver of the plurality of link drivers for initializing a second communication link between the controller and the storage element, wherein the second communication link utilizes a third communication medium independent of both the first communication medium and the second communication medium.

14. The computing device of claim 13, wherein the second communication medium is an optical communication medium.

15. The computing device of claim 13, wherein the storage element includes at least one of an SAS expander or a storage device.

16. The computing device of claim 13, wherein the provided signal is a first initialization signal and is part of a first initialization technique, and wherein the subcontroller is further operable to:
   detect that the communication link was not successfully initialized; and
   in response to detecting that the communication link was not successfully initialized, provide a second initialization signal to the driver for initializing the communication link, wherein the second initialization signal is part of a second initialization technique that is different from the first initialization technique.

17. The computing device of claim 13, wherein the subcontroller is further operable to determine whether hardware associated with the communication link is present.

* * * * *